(12) United States Patent
Shwarsctein et al.

(10) Patent No.: US 12,350,897 B1
(45) Date of Patent: Jul. 8, 2025

(54) OPTICAL COMPONENT WITH ILLUMINATION LAYER AND LENS CURVATURE

(71) Applicant: Meta Platforms Technologies, LLC, Menlo Park, CA (US)

(72) Inventors: Alan Kleiman Shwarsctein, Saratoga, CA (US); Adar Magen, Sunnyvale, CA (US); Shay Hamer, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 268 days.

(21) Appl. No.: 18/100,511

(22) Filed: Jan. 23, 2023

(51) Int. Cl.
| | | |
|---|---|---|
| *B29D 11/00* | | (2006.01) |
| *G02B 1/04* | | (2006.01) |
| *G02B 27/00* | | (2006.01) |
| *G02B 27/01* | | (2006.01) |

(52) U.S. Cl.
CPC .. *B29D 11/00009* (2013.01); *B29D 11/00932* (2013.01); *G02B 1/041* (2013.01); *G02B 27/0093* (2013.01); *G02B 27/0172* (2013.01)

(58) Field of Classification Search
CPC ........ B29D 11/00009; B29D 11/00932; G02B 1/041; G02B 27/0093; G02B 27/0172
See application file for complete search history.

(56) References Cited

U.S. PATENT DOCUMENTS

| | | |
|---|---|---|
| 5,087,677 A | 2/1992 | Brekner et al. |
| 7,086,928 B2 | 8/2006 | Siders et al. |
| 8,711,487 B2 | 4/2014 | Takeda et al. |
| 9,039,906 B2 | 5/2015 | Schulz et al. |
| 11,181,667 B2 | 11/2021 | Tsai et al. |
| 2022/0082843 A1 | 3/2022 | Magyari |

*Primary Examiner* — Jacob T Minskey
*Assistant Examiner* — Adrianna N Konves
(74) *Attorney, Agent, or Firm* — Greenberg Traurig, LLP (57) ABSTRACT

An illumination layer is coupled with a glass substrate. A refractive layer is overmolded over the illumination layer. The refractive layer may encapsulate light sources and electrical traces of the illumination layer. A lens curvature is formed in the refractive layer.

12 Claims, 8 Drawing Sheets

OPTICAL COMPONENT WITH ILLUMINATION LAYER AND LENS CURVATURE

TECHNICAL FIELD

This disclosure relates generally to optics, and in particular to fabricating optical components.

BACKGROUND INFORMATION

Eye-tracking can be an advantageous feature for head mounted devices such as smartglasses or head mounted displays (HMDs) such as virtual reality (VR) or augmented reality (AR) headsets. In some contexts, a lens including optical power is also included in the head mounted device or HMD. A fabrication technique for optical components that includes eye-tracking features and optical power is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of optical components and fabrications techniques for optical components that include an illumination layer and a lens curvature are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm.

In aspects of this disclosure, the term "transparent" may be defined as having greater than 70% transmission of light. In some aspects, the term "transparent" may be defined as a material having greater than 70% transmission of visible light.

Techniques for fabricating optical components that include eye-tracking features and optical power are disclosed. In some implementations, a prescription lens is fabricated into the optical component. Prior solutions for fabricating optical components included utilizing one or more optically clear adhesives (OCA) to laminate a lens to an eye-tracking layer. In an implementation of the disclosure, a refractive layer (e.g. a polymer refractive layer) is overmolded onto an illumination layer that includes light sources (e.g. near-infrared LEDs). The refractive layer may function as both an encapsulant layer to the light sources (and the electrical traces that power/drive the light sources) and a refractive lens. In some implementations, a lens curvature having optical power is formed in the refractive layer. The lens curvature may be formed in a subtractive process (e.g. diamond-turning the lens curvature in the refractive layer) or molded with the mold shape including the lens curvature. The techniques in the disclosure may reduce the process steps and/or lower the expense of prior fabrication techniques. These and other embodiments are described in more detail in connection with FIGS. 1-4F.

Figure 1:
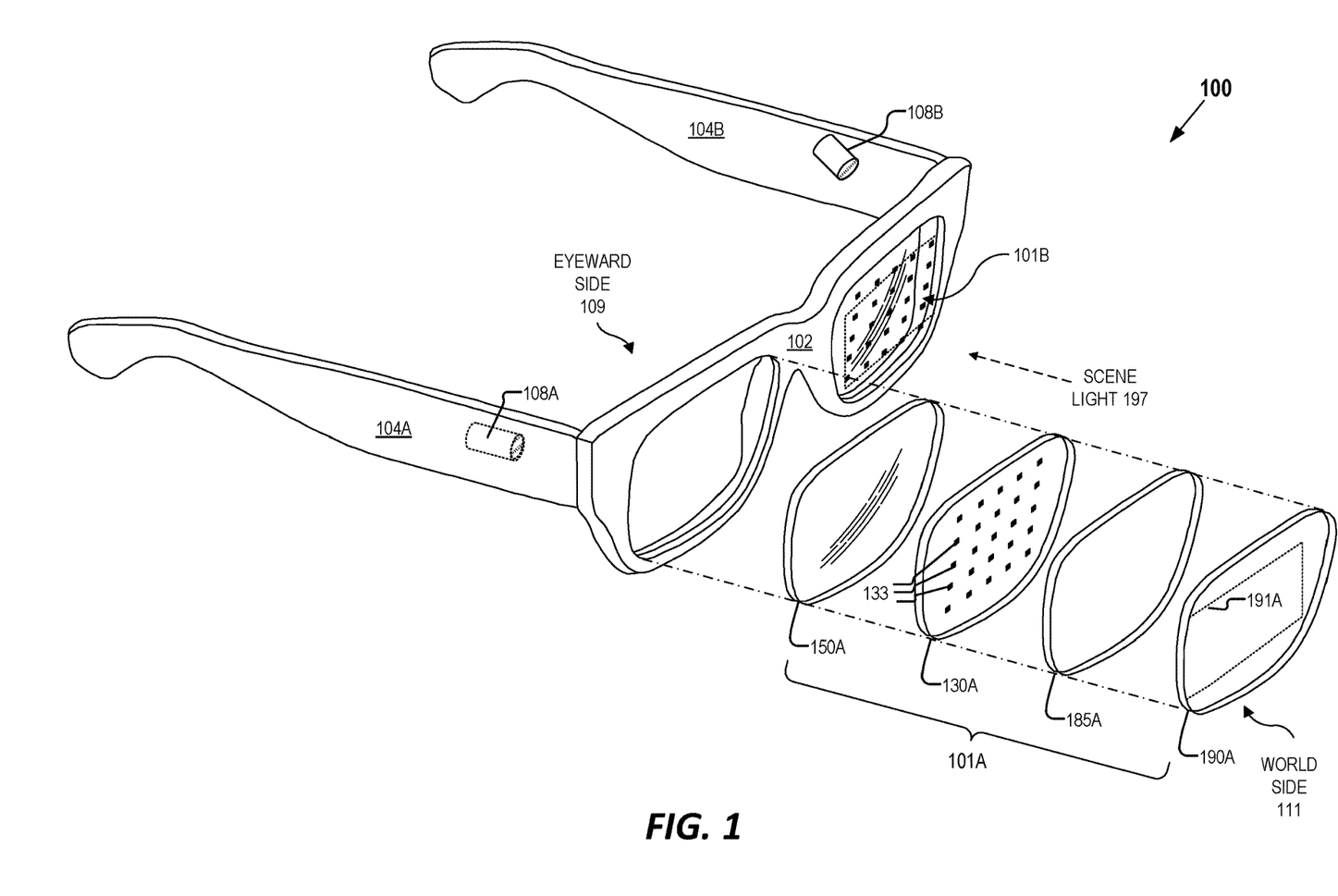
FIG. 1 illustrates an example head mounted device that includes an optical component, in accordance with aspects of the disclosure.

FIG. 1 illustrates an example head mounted device 100 that includes an optical component, in accordance with aspects of the present disclosure. The illustrated example of head mounted device 100 is shown as including a frame 102, temple arms 104A and 104B, and near-eye optical elements 101A and 101B (collectively referred to as near-eye optical elements 101). Cameras 108A and 108B are shown as coupled to temple arms 104A and 104B, respectively, although the cameras may be mounted in different locations in different implementations. FIG. 1 also illustrates an exploded view of an example of near-eye optical element 101A. Near-eye optical element 101A is shown as including a lens layer 150A, an illumination layer 130A, an optical combiner layer and/or near-infrared (NIR) absorber layer 185A, and a display layer 190A. Display layer 190A may include a waveguide 191A that is configured to direct virtual images to an eye of a user of head mounted device 100. In implementations where head mounted device 100 includes a display, head mounted device 100 may be considered a head mounted display (HMD) to facilitate virtual reality (VR) or augmented reality (AR). In some implementations, head mounted device 100 does not include a display and is considered smartglasses. Smartglasses may include eye-tracking functionality, audio, microphone, processing, and/or networking communication functionality while not necessarily including a display.

Illumination layer 130A is shown as including a plurality of light sources 133 configured to emit illumination toward an eyeward side 109 of near-eye optical element 101A. Light sources 133 may be described as "in-field" because they are in a field of view (FOV) of a user of the head mounted device 100. Light sources 133 may be in a same FOV that a user views a display of the head mounted device 100, in an implementation. Light sources 133 may be in a same FOV that a user views an external environment of the head mounted device 100 via scene light 197 propagating through near-eye optical elements 101. While light sources 133 may introduce minor occlusions into the near-eye optical element 101A, the light sources 133, as well as their corresponding electrical routing may be so small as to be unnoticeable or insignificant to a wearer of head mounted device 100. Additionally, any occlusion from light sources 133 may be placed so close to the eye as to be unfocusable by the human eye and therefore assist in the light sources 133 being not noticeable or insignificant. In some implementations, each light source 133 has a footprint (or size) that is less than about 200×200 microns. When head mounted device 100 is being worn by a user, the light sources 133 may be disposed between 10 mm and 30 mm from the eye. In some embodiments, the light sources 133 may be placed between 15 mm and 25 mm from the eye of a user. The light sources 133 may be infrared light sources 133 configured to emit infrared illumination light for eye-tracking purposes, for example. The light sources 133 may be near-infrared light sources 133 configured to emit near-infrared illumination light for eye-tracking purposes.

As shown in FIG. 1, frame 102 is coupled to temple arms 104A and 104B for securing the head mounted device 100 to the head of a user. Example head mounted device 100 may also include supporting hardware incorporated into the frame 102 and/or temple arms 104A and 104B. The hardware of head mounted device 100 may include any of processing logic, wired and/or wireless data interface for sending and receiving data, graphic processors, and one or more memories for storing data and computer-executable instructions. In one example, head mounted device 100 may be configured to receive wired power and/or may be configured to be powered by one or more batteries. In addition, head mounted device 100 may be configured to receive wired and/or wireless data including video data.

FIG. 1 illustrates near-eye optical elements 101A and 101B that are configured to be mounted to the frame 102. In some examples, near-eye optical elements 101A and 101B may appear transparent to the user to facilitate AR or mixed reality (MR) such that the user can view visible scene light 197 from the environment while also receiving display light directed to their eye(s) by way of display layer 190A. In further examples, some or all of near-eye optical elements 101A and 101B may be incorporated into a VR headset where the transparent nature of the near-eye optical elements 101A and 101B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 130A includes a plurality of light sources 133. Each light source 133 may be disposed on a transparent substrate and may be configured to emit light towards an eyeward side 109 of the near-eye optical element 101A. In some aspects of the disclosure, the light sources 133 are configured to emit near infrared light (e.g. 750 nm-1.4 µm). Each light sources 133 may be a micro light emitting diode (micro-LED), an edge emitting LED, a vertical cavity surface emitting laser (VCSEL) diode, or a Superluminescent diode (SLED).

As mentioned above, the light sources 133 of the illumination layer 130A may be configured to emit infrared illumination light towards the eyeward side 109 of the near-eye optical element 101A to illuminate the eye of a user. The near-eye optical element 101A is shown as including optical combiner layer 185A where the optical combiner layer 185A is disposed between the illumination layer 130A and a worldside 111 of the near-eye optical element 101A. In some aspects, the optical combiner layer 185A is configured to receive returning infrared light that is reflected/scattered by the eye/skin/eyelash of the user and to direct the returning infrared light towards camera 108A to capture an eye-tracking image. In some aspects, the optical combiner layer 185A is transmissive to visible light, such as scene light 197 incident on the world side 111 of the near-eye optical element 101A. In some implementations, the optical combiner layer 185A may be configured as a volume hologram and/or may include one or more Bragg gratings for directing the returning infrared light towards the camera 108A. In some examples, the optical combiner layer 185A includes a polarization-selective volume hologram (a.k.a. polarized volume hologram) that diffracts (in reflection) a particular polarization orientation of incident light while passing other polarization orientations. It is also possible that the optical combiner layer 185A would have the function to reflect or absorb the NIR light so it does not pass into subsequent layers of the combiner or propagate to display layer 190A.

Display layer 190A may include one or more other optical elements depending on the design of the head mounted device 100. For example, display layer 190A may include a waveguide 191A to direct display light generated by an electronic display to the eye of the user. In some implementations, at least a portion of the electronic display is included in the frame 102 of the head mounted device 100. The electronic display may include an LCD, an organic light emitting diode (OLED) display, micro-LED display, pico-projector, or liquid crystal on silicon (LCOS) display for generating the display light.

Lens layer 150A is shown as being disposed between the illumination layer 130A and the eyeward side 109 of the near-eye optical element 101A. Lens layer 150A may receive the infrared illumination light emitted by the illumination layer 130A and pass the infrared illumination light to illuminate the eye of the user. As mentioned above, lens layer 150A may also be transparent to visible light, such as scene light 197 received from the environment and/or display light received from the display layer 190A. In some examples, lens layer 150A has one or more lens curvatures for focusing light (e.g., display light and/or scene light) to the eye of the user. Thus, lens layer 150A may, in some examples, may be referred to as a lens. In some aspects, lens layer 150A has a thickness and/or curvature that corresponds to the specifications of a user. In other words, lens layer 150A may be a prescription lens. However, in other examples, lens layer 150A may be a non-prescription lens.

Figure 2A:
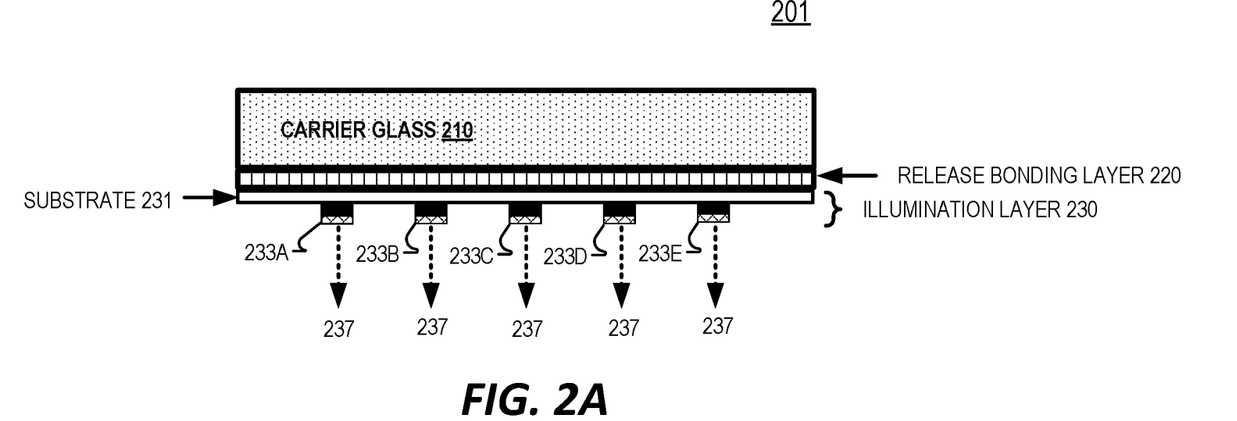
FIGS. 2A-2F illustrate an example technique for fabricating an optical component, in accordance with aspects of the disclosure.

FIGS. 2A-2F illustrate an example technique for fabricating an optical component, in accordance with aspects of the disclosure. FIG. 2A illustrates optical component 201 includes a carrier glass substrate 210, a release bonding layer 220, and an illumination layer 230. Forming optical component 201 in FIG. 2A may include adhering illumination layer 230 to carrier glass substrate 210 with the release bonding layer 220. Release bonding layer 220 is disposed between illumination layer 230 and carrier glass 210. Release bonding layer 220 may be a thermal debonding layer that releases at a certain release temperature (heating or cooling), but could also be an ultraviolet (UV) release layer, for example. Example illumination layer 230 includes a substrate 231 and light sources 233A, 233B, 233C, 233D, and 233E (collectively referred to as light sources 233). Light sources 233 may be an LED, a VCSEL, or a SLED, for example. The light sources may emit illumination light 237. Illumination light 237 may be near-infrared light. Substrate 231 may be a polymer substrate. Illumination layer 230 includes electrical traces (not specifically illustrated) that power and/or drive the light sources 233 to emit (or not emit) illumination light 237. The electrical traces may be disposed on the surface of substrate 231. The electrical traces may be made of a transparent or semi-transparent conductor (e.g. indium tin oxide), but can also be metallic (Ni, Cu, Ag, Au, Pt, Pd, Sn, SnBi or a combination).

Figure 2B:
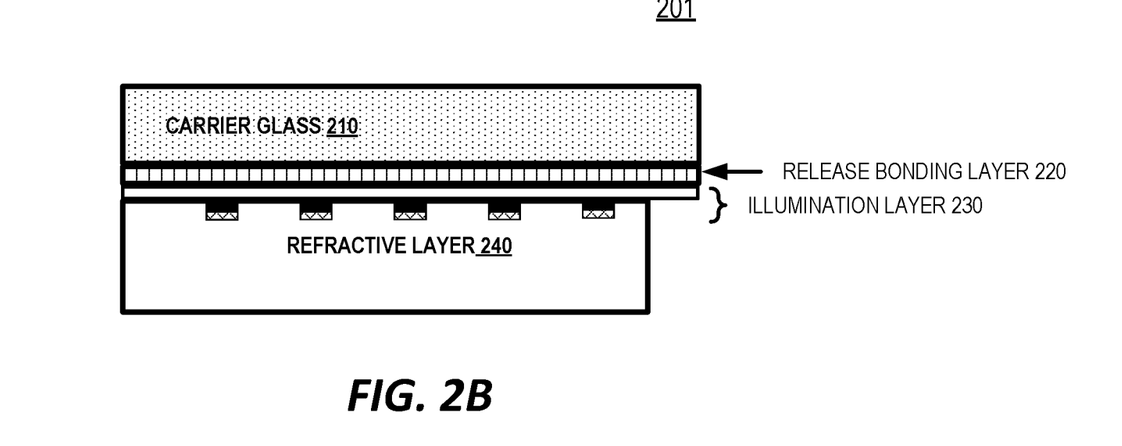

In FIG. 2B, a refractive layer 240 is overmolded over illumination layer 230. Refractive layer 240 may be a refractive polymer layer. Refractive layer 240 may be cyclic olefin copolymer (COC) or a cyclic olefin polymer (COP), a silicone material, epoxy material, or other thermoplastics. In the illustrated implementation of FIG. 2B, refractive layer 240 is overmolded over a portion of illumination layer 230, although refractive layer 240 may be overmolded over the entire illumination layer 230, in some implementations. Overmolding refractive layer 240 over illumination layer 230 includes encapsulating light sources 233 and the electrical traces of illumination layer 230, in the example illustration of FIG. 2B.

Figure 2C:
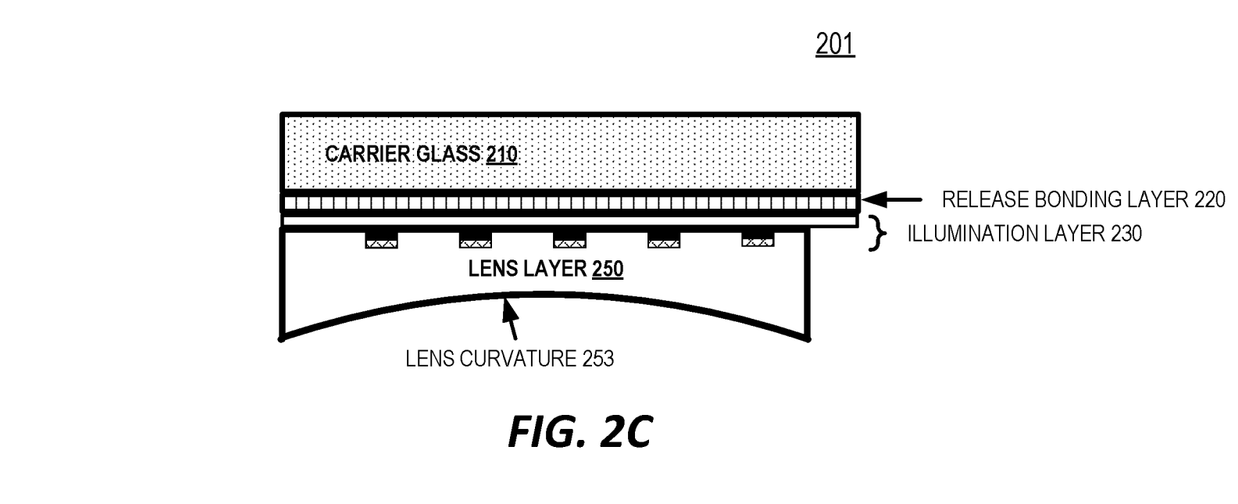

In FIG. 2C, a lens curvature 253 is formed in the refractive layer 240 to generate lens layer 250. Lens curvature 253 provides optical power. In an implementation, lens curvature 253 has a prescription optical power. In an implementation, forming lens curvature 253 into the refractive polymer layer 240 to generate lens layer 250 includes a subtractive process that removes a portion of the refractive polymer layer 240 to form the lens curvature 253. In an implementation, the subtractive process includes diamond-turning the lens curvature 253. The subtractive process could include other techniques, in other implementations. Other implementations of the required curvature could be achieved during the overmold process.

Overmolding refractive layer 240 over illumination layer 230 may include applying a metal mold over illumination layer 230 and filling or injecting the mold with a polymer and then curing the polymer in the shape of the metal mold and then removing the metal mold from optical component 201. In an implementation, forming lens curvature 253 into the refractive layer 240 includes forming lens curvature 253 using a lens mold prior to the refractive polymer layer curing. Thus, lens curvature 253 may be shaped by the mold that is used to overmold refractive layer 240 over illumination layer 230, in some implementations. Several technologies including high pressure and low pressure molding, transfer molding or compression molding can be used as suitable processes for this application.

Figure 2D:
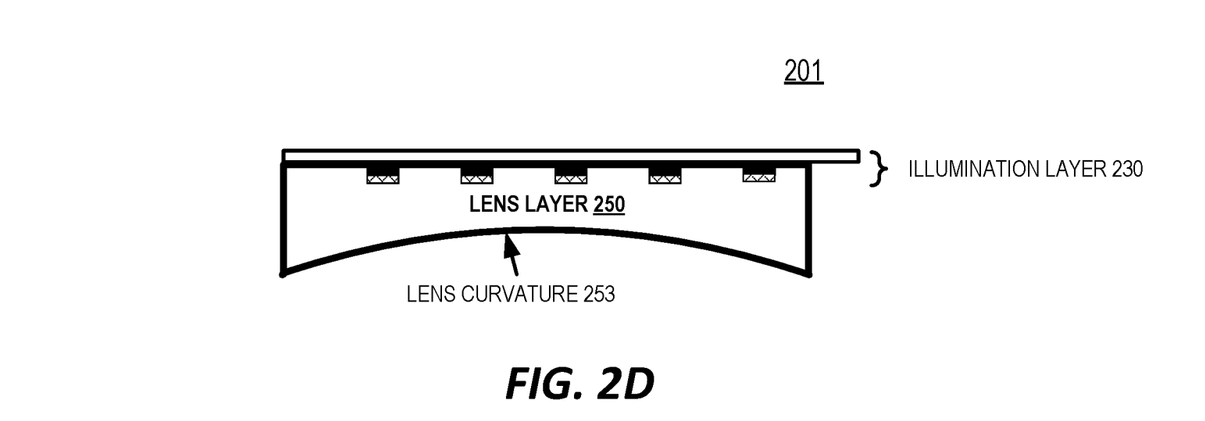

In FIG. 2D, carrier glass 210 is separated from the illumination layer 230 and the lens layer 250 in a debonding process. In implementations where release bonding layer 220 is a thermal debonding layer, separating the carrier glass substrate 210 from illumination layer 230 and lens layer 250 includes a thermal debonding process. The refractive layer 240 (and lens layer 250) may be cured or substantially cured prior to separating the carrier glass substrate 210 from illumination layer 230 and lens layer 250.

Figure 2E:
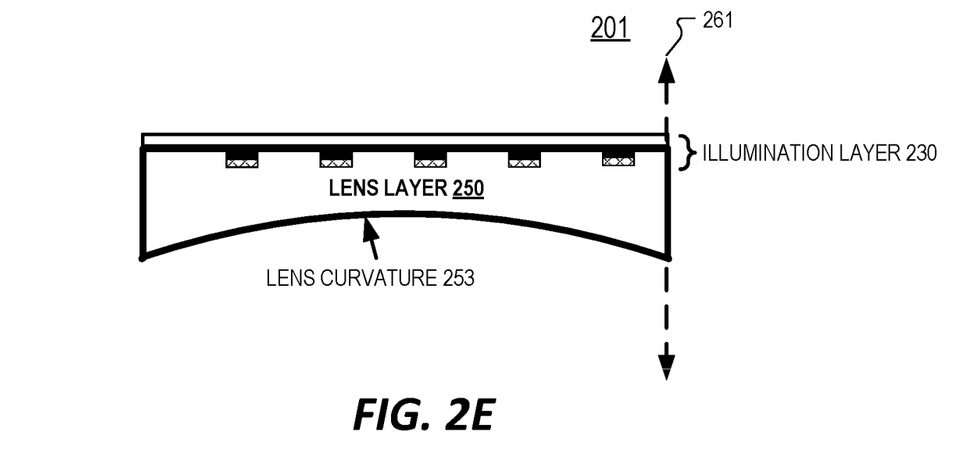

In FIG. 2E, the illumination layer 230 and lens layer 250 are shaped into a lens shape (e.g. shape of near-eye optical element 101A in FIG. 1). Shaping illumination layer 230 and lens layer 250 into a lens shape may include laser cutting optical component 201 along line 261, in FIG. 2E. Therefore, a portion of the illumination layer 230 may be trimmed/cut in the shaping process of FIG. 2E. The shaping process of FIG. 2E is subsequent to overmolding the refractive layer 240 over illumination layer 230.

Figure 2F:
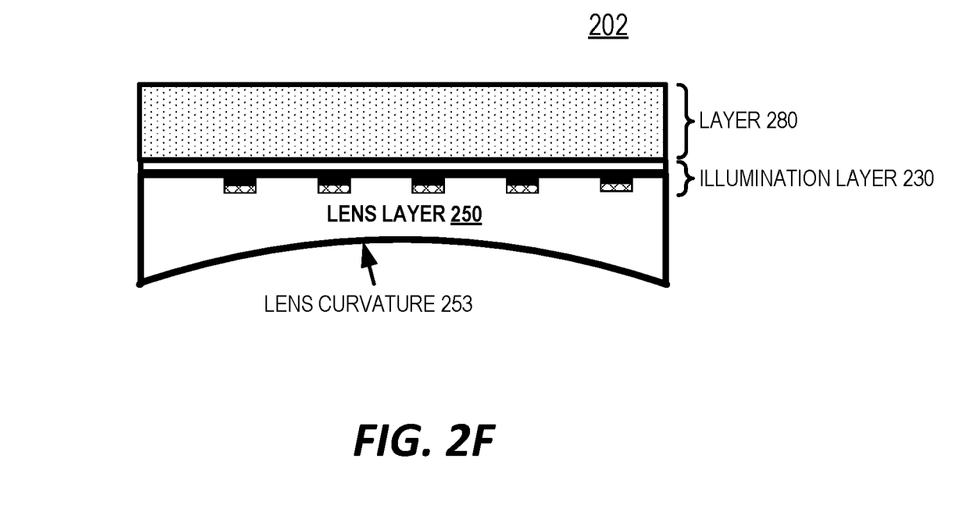

In FIG. 2F, an additional optical layer 280 is optionally added to the optical component 201 of FIG. 2E to generate optical component 202. Layer 280 may include one or more optical layers such as an optical combiner layer and/or a display layer such as optical combiner layer 185A and display layer 190A of FIG. 1. Other optical layers may be included in optical layer 280. Optical layer 280 may be bonded to the substrate 231 of illumination layer 230 by an optically clear adhesive (OCA), for example.

Figure 3:
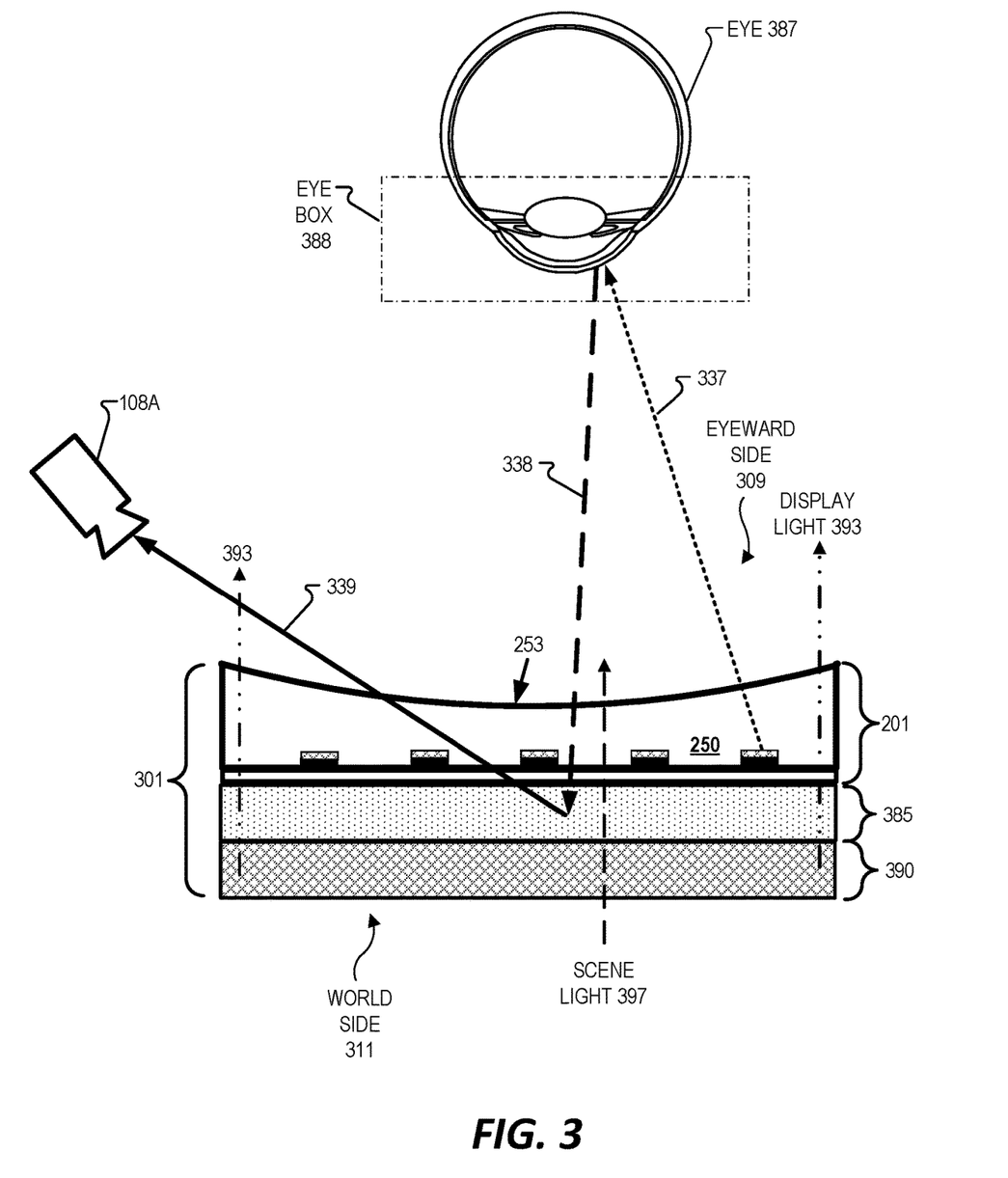
FIG. 3 illustrates an example optical element bonded to an optical combiner layer and a display layer, in accordance with aspects of the disclosure.

FIG. 3 illustrates an example optical element 301 that includes the optical component 201 of FIG. 2E bonded to an optical combiner layer 385 and a display layer 390, in accordance with aspects of the disclosure. Display layer 390 directs display light 393 to an eye 387 occupying an eyebox region 388. Display light 393 propagates through optical combiner layer 385, and lens layer 250. Lens curvature 253 imparts optical power to display light 393. Lens curvature 253 also imparts optical power to scene light 397 that propagates through from world side 311 of optical element 301 through display layer 390, optical combiner layer 385, and lens layer 250. Display light 393 presents a virtual image to eye 387. Light sources (e.g. light sources 233) included in the optical component 201 are disposed to direct illumination light through lens layer 250 toward eyebox region 388 on the eyeward side 309 of optical element 301. The illumination light emitted by the light sources may be near-infrared illumination light.

In FIG. 3, an eye-tracking optical path is illustrated that starts with a light source emitting illumination light 337 through lens layer 250 toward the eyebox region 388. The illumination light 337 is reflected and/or scattered as returning light 338 by eye 387 and any eyelid, eyelash, or skin occupying eyebox region 388. Returning light 338 is then directed to camera 108A as directed light 339 by optical combiner layer 385. Optical combiner layer 385 may include a diffractive optical element (DOE) that is tuned to direct a particular narrow-band wavelength of light at a particular angle to direct the particular narrow-band wavelength of light to the camera 108A. By way of example and not limitation, where illumination light 337 is near-infrared light centered around 850 nm, a DOE of optical combiner layer 385 may be configured to diffract incident 850 nm light toward camera 108A while passing other wavelengths of light (e.g. passing visible light such as display light 393 and scene light 397). Camera 108A may be configured with a bandpass filter so that camera 108A only images light centered around the particular narrow-band wavelength of light emitted by the light sources.

Figure 4A:
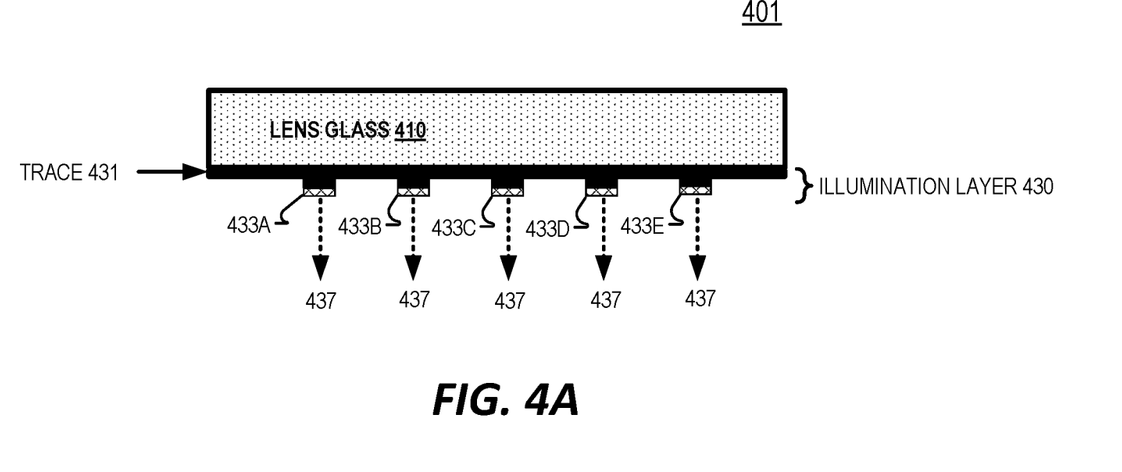
FIGS. 4A-4F illustrate example techniques for fabricating an optical component that includes glass, in accordance with aspects of the disclosure.

FIGS. 4A-4D illustrate an example technique for fabricating an optical component that includes glass, in accordance with aspects of the disclosure. FIG. 4A illustrates optical component 401 includes a glass substrate 410 and an illumination layer 430. Glass substrate 410 may be precut into the shape of a lens and may be referred to as "lens glass." The glass substrate 410 perimeter may be precut into a lens shape prior to forming illumination layer 430 onto glass substrate 410. Glass substrate 410 may be 300-500 μm thick, in some implementations. The term glass is used in generic form and can include different glass type materials such as harding glass (ion exchange glass) or Borosilicate (N-BK7), aluminosilicate glass, or Alkaline-free aluminoborosilicate glass amongst others. Example illumination layer 430 includes a trace layer 431 and light sources 433A, 433B, 433C, 433D, and 433E (collectively referred to as light sources 433). Light sources 433 may be an LED, a VCSEL, or a SLED, for example. The light sources 433 may emit illumination light 437. Illumination light 437 may be near-infrared light. Trace layer 431 is disposed between illumination layer 430 and glass substrate 410. Electrical traces in trace layer 431 may be disposed (e.g. adhered) directly to glass substrate 410. The electrical traces in trace layer 431 may power and/or drive the light sources 433 to emit (or not emit) illumination light 437. The electrical traces may be made of a transparent or semi-transparent conductor (e.g. indium tin oxide) but can also be metallic (Ni, Cu, Ag, Au, Pt, Pd, Sn, SnBi or a combination of metals).

Figure 4B:
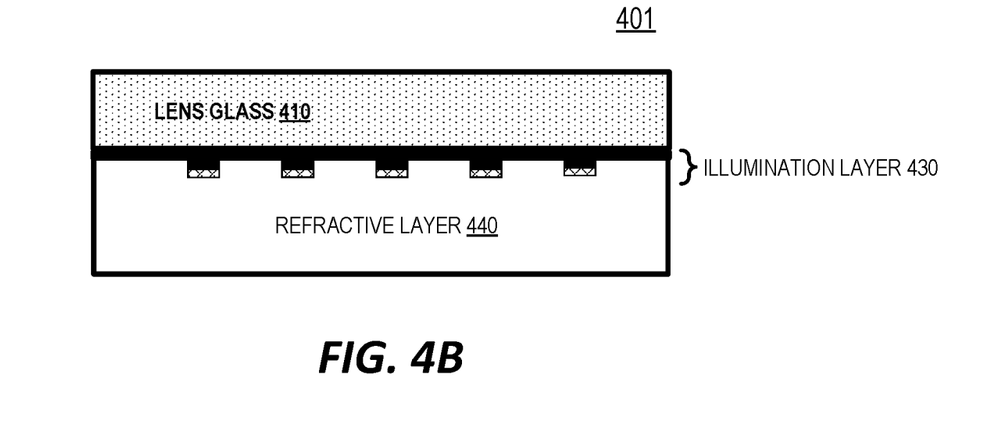

In FIG. 4B, a refractive layer 440 is overmolded over illumination layer 430. Refractive layer 440 may be a refractive polymer layer. Refractive layer 440 may be cyclic olefin copolymer (COC) or a cyclic olefin polymer (COP), however other transparent polymers can be used. Overmolding refractive layer 440 over illumination layer 430 includes encapsulating light sources 433 and the electrical traces of trace layer 431 included in illumination layer 430, in the example illustration of FIG. 4B.

Figure 4C:
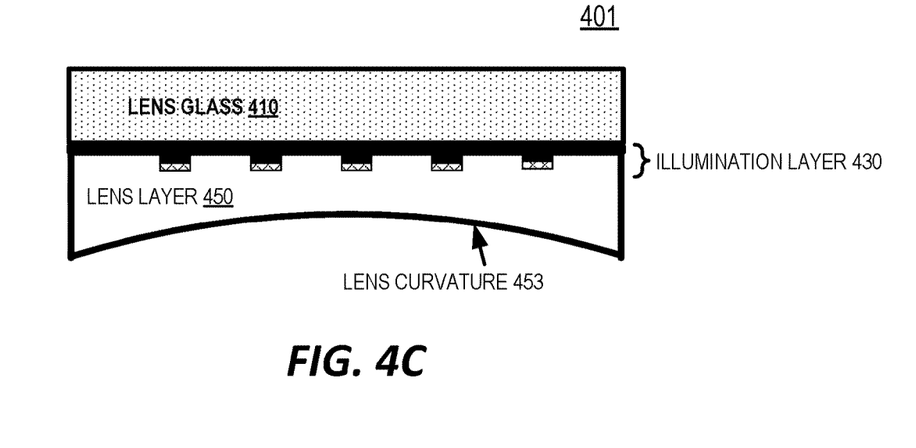

In FIG. 4C, a lens curvature 453 is formed in the refractive layer 440 to generate lens layer 450. Lens curvature 453 provides optical power. In an implementation, lens curvature 453 has a prescription optical power. In an implementation, forming lens curvature 453 into the refractive polymer layer 440 to generate lens layer 450 includes a subtractive process that removes a portion of the refractive polymer layer 440 to form the lens curvature 453. In an implementation, the subtractive process includes diamond-turning the lens curvature 453. The subtractive process could include other techniques, in other implementations. Overmolding refractive layer 440 over illumination layer 430 may include applying a metal mold over illumination layer 430 and filling or injecting the mold with a polymer and then curing the polymer in the shape of the metal mold and then removing the metal mold from optical component 401. In an implementation, forming lens curvature 453 into the refractive layer 440 includes forming lens curvature 453 using a lens mold prior to the refractive polymer layer curing. Thus, lens curvature 453 may be shaped by the mold that is used to overmold refractive layer 440 over illumination layer 430, in some implementations.

Figure 4D:
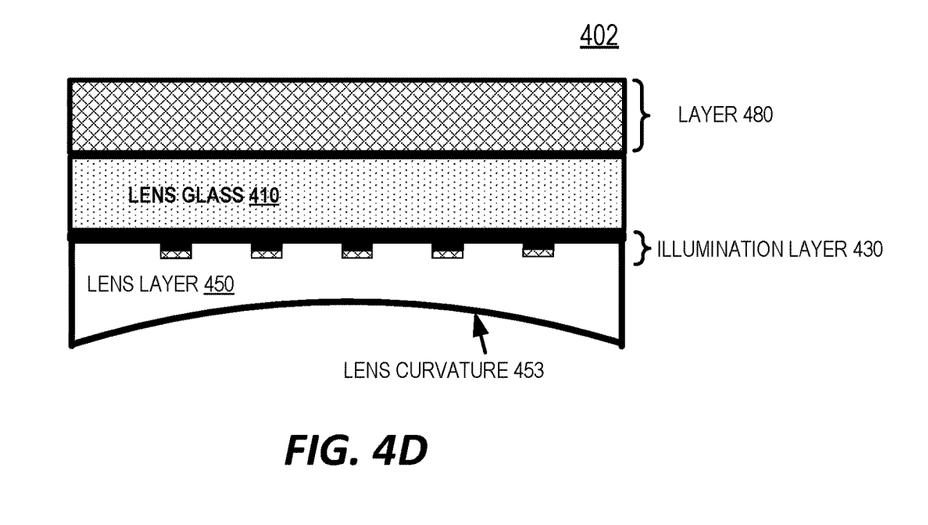

In FIG. 4D, an additional optical layer 480 is optionally added to the optical component 401 of FIG. 2E to form optical component 402. Layer 480 may include one or more optical layers such as an optical combiner layer and/or a display layer such as optical combiner layer 185A and display layer 190A of FIG. 1. Other optical layers may be included in optical layer 480. Optical layer 480 may be bonded to lens glass 410 by an optically clear adhesive (OCA), for example. Optical component 402 may replace optical element 301 of FIG. 3 and function similarly to optical element 301.

Figure 4E:
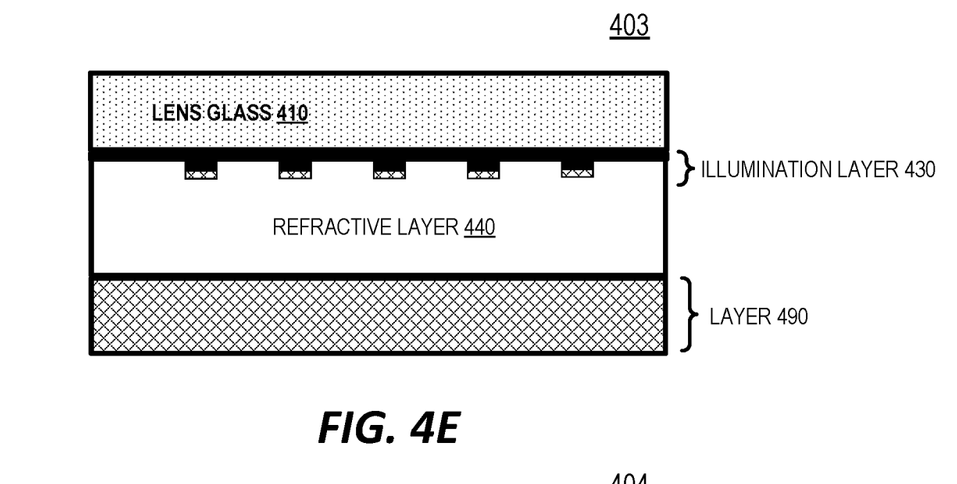

In FIG. 4E, a lens element layer 490 is laminated to optical component 401 to form optical component 403. Lens element layer 490 may include a plastic, glass or plastic/glass insert with a curvature to add a specific curvature to the illumination layer 430. Refractive layer 440 may be a suitable substrate for attachment of an optical element by use of OCA, liquid optically clear adhesive (LOCA), or solvent adhesion amongst other known techniques to bond optical elements.

Figure 4F:
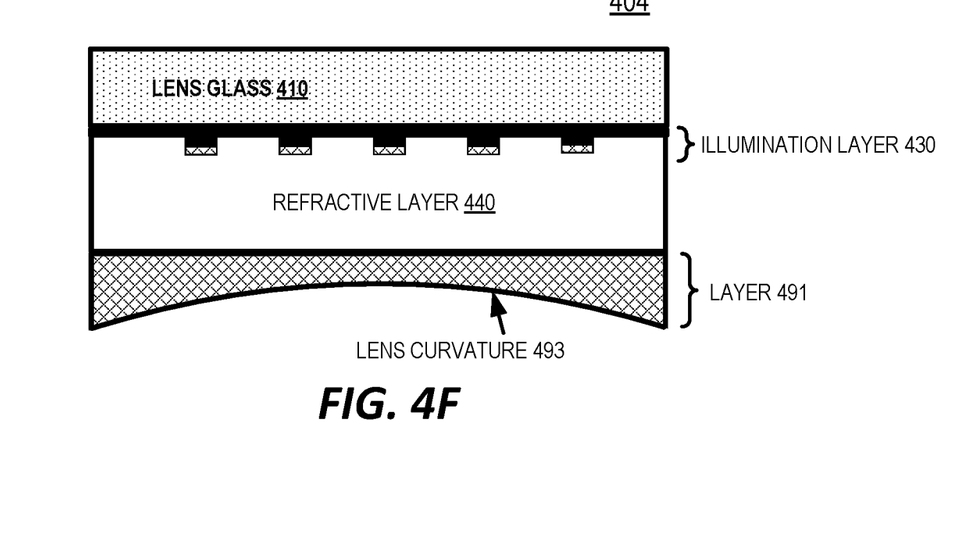

FIG. 4F illustrates an optical component 404 that includes a lens element layer 491 having a lens curvature 493. Layer 491 may be a plano-concave element that is bonded to refractive layer 440 or lens curvature 493 may be formed by a subtractive process that removes a portion of layer 490 in FIG. 4E.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of fabricating an optical component, the method comprising:
   adhering an illumination layer to a carrier glass substrate with a release bonding layer, wherein the illumination layer includes light sources and electrical traces for activating the light sources;
   overmolding a refractive polymer layer over the illumination layer;
   forming a lens curvature into the refractive polymer layer to generate a lens layer, wherein the lens curvature provides optical power; and
   separating the carrier glass substrate from the illumination layer and the lens layer in a debonding process.

2. The method of claim 1 further comprising:
   shaping the illumination layer and the lens layer into a lens shape, wherein the shaping is subsequent to overmolding the refractive polymer layer over the illumination layer.

3. The method of claim 1, wherein forming the lens curvature into the refractive polymer layer includes forming the lens curvature using a lens mold prior to the refractive polymer layer curing.

4. The method of claim 1, wherein forming the lens curvature into the refractive polymer layer includes a subtractive process that removes a portion of the refractive polymer layer to form the lens curvature.

5. The method of claim 4, wherein the subtractive process includes diamond-turning the lens curvature.

6. The method of claim 1, wherein overmolding the refractive polymer layer over the illumination layer includes the refractive polymer layer encapsulating the light sources and the electrical traces.

7. The method of claim 1, wherein the release bonding layer is a thermal debonding layer or an ultraviolet (UV) debonding layer.

8. The method of claim 1, wherein the refractive polymer layer includes at least one of a cyclic olefin copolymer (COC) or a cyclic olefin polymer (COP).

9. The method of claim 1 further comprising:
   curing the refractive polymer layer prior to separating the carrier glass substrate from the illumination layer and the lens layer.

10. The method of claim 1, wherein the light sources are near-infrared light sources, and wherein emission apertures of the near-infrared light sources are disposed to direct near-infrared illumination light through the lens layer.

11. The method of claim 1, wherein the lens curvatures is achieved by bonding a polymer, glass, or glass/polymer substrate over a flat overmold of the refractive polymer layer.

12. The method of claim 1 further comprising:
   coupling an optical combiner layer to the illumination layer, wherein the optical combiner layer is configured to direct a narrow-band near-infrared wavelength to a camera, and wherein the light sources are configured to emit the narrow-band near-infrared wavelength, the optical combiner layer also configured to transmit visible light wavelengths.

* * * * *